United States Patent [19]
Yano et al.

[11] Patent Number: 5,363,006
[45] Date of Patent: Nov. 8, 1994

[54] STATOR FOR ULTRASONIC MOTOR AND METHOD FOR MANUFACTURING THE SAME

[75] Inventors: Motoyasu Yano, Hamamatsu; Yoshinori Takemura, Kosai; Takao Suzuki, Okazaki, all of Japan

[73] Assignees: Asmo Co., Ltd., Shizuoka; Nippondenso Col, Ltd., Aichi, both of Japan

[21] Appl. No.: 981,372

[22] Filed: Nov. 25, 1992

[30] Foreign Application Priority Data

| | | |
|---|---|---|
| Nov. 27, 1991 [JP] | Japan | 3-337657 |
| Mar. 5, 1992 [JP] | Japan | 4-048878 |
| Nov. 13, 1992 [JP] | Japan | 4-304190 |

[51] Int. Cl.$^5$ .................................. H01L 41/08
[52] U.S. Cl. ..................................... 310/323
[58] Field of Search ........................ 310/323, 328

[56] References Cited

U.S. PATENT DOCUMENTS

| | | | |
|---|---|---|---|
| 4,580,073 | 4/1986 | Okumura et al. | 310/323 |
| 5,187,406 | 2/1993 | Seki | 310/323 |

FOREIGN PATENT DOCUMENTS

| | | | |
|---|---|---|---|
| 3345274 | 6/1984 | Germany | 310/323 |
| 0293979 | 12/1987 | Japan | 310/323 |
| 63-143096 | 9/1988 | Japan . | |
| 3198674 | 8/1991 | Japan . | |
| 4109878 | 4/1992 | Japan . | |

*Primary Examiner*—Mark O. Budd
*Attorney, Agent, or Firm*—Stetina & Brunda

[57] ABSTRACT

A stator for use in an ultrasonic motor is made of sintered metal. The stator includes a circular land portion which is connected to a piezoelectric element, and a plurality of teeth formed at the land portion by a plurality of radial slits. Each tooth includes a top surface for contacting a rotor, a front surface for forming a part of peripheral surface of the stator, and a rear surface facing the axial center. The front and rear surfaces are formed parallel to the axial center.

7 Claims, 11 Drawing Sheets

STATOR FOR ULTRASONIC MOTOR AND METHOD FOR MANUFACTURING THE SAME

BACKGROUND OF THE INVENTION

1. Field of the Invention

The present invention relates generally to an ultrasonic motor including a rotor and a stator. More particularly, the present invention pertains to a stator and a method for manufacturing the same, which improve the rotational torque, output power and rotational efficiency of the rotor.

2. Description of the Related Art

A conventional ultrasonic motor generally includes a metal stator, a rotor disposed on the top surface of the stator and a piezoelectric element (not shown) disposed at the bottom surface of the stator. When an alternating voltage is applied to the piezoelectric element, the stator is caused to vibrate. The vibration of the stator causes the rotor to rotate. FIG. 25 shows such a conventional stator 50. A plurality of slits 51 are radially formed in the top surface of the stator 50. A plurality of projections 52 are formed in the top surface of the stator 50, between adjacent slits 51. When the stator 50 is caused to vibrate, progress waves are generated in the projections 52. Those progress waves drive the rotor efficiently.

In the above-described stator, it is very important to properly set the width of the slit 51 (the gap between two adjacent projections 52). If the width of the slit is relatively wide, the rotor will not rotate efficiently, since the contact area between the rotor and the top surface of the projection 52 is decreased. Therefore, it is preferable to narrowdown the slit width as much as possible, in order to increase the contact area between the rotor and the projections 52.

Generally, the slits 51 are formed by cutting a base body. There are several consecutive cutting steps that need to be performed. As a result, the time required for manufacturing the stator is rather long, and the manufacturing cost is increased. Furthermore, the large scale polishing process (lapping process) is required, in order to flatten the top surfaces of the projections 52 which slidably contact the rotor. Therefore, the manufacture of the stator by cutting a single metal block requires a relatively long manufacturing time. One attempted solution has been to sinter fine metal particle or casting metal substance, in order to shorten the manufacturing time of the stator 50, and to simplify its lapping process of the stator 50.

However, when the projections 52 are formed in the stator 50 by sintering or casting, there is a limitation on the width of the slit. Further, when the stator 50 is manufactured by the sintering process, the stator 50 become porous. In other words, the density of the stator becomes lower than that of the stator which is manufactured by cutting the single metal block. The lower density of the stator causes the vibration to decrease, and consequently the rotor does not operate efficiently.

Japanese Unexamined Patent Publication No. 3-198674 discloses the ultrasonic motor which includes the stator manufactured with a porous sintered body. As illustrated in FIG. 26, the stator includes a plurality projections 52, each of which has a trapezoidal side 52b. Each projection 52 includes surface 52a inclined toward the center of the stator. When the stator having such surfaces is manufactured by the sintering process, a pre-compressed body having the similar shape to the stator should be manufactured by compressing the fine metal particle, prior to sintering.

During the compressing process, a compressing force is applies to the pre-compressed body along the axial direction thereof. Therefore, the surfaces extending in the direction perpendicular to the direction of the compressing force are provided to secure compressing. But, the surfaces (such as inclined surface 52a) inclined in the direction of the compressing force could not be provided to secure compressing. The density of the inclined surface 52a of the pre-compressed body is lowered with respect to the other parts thereof. When the pre-compressed body having parts of differed densities is sintered, the stator will have uneven density teeth. As a result, such a stator cannot drive the rotor effectively.

SUMMARY OF THE INVENTION

Accordingly, it is a primary object of the present invention to provide a stator for use in an ultrasonic motor, such that the stator is easily manufactured, and is capable of driving the rotor efficiently.

The second object of the present invention is to provide a simpler manufacturing method for the stator which drives the rotor efficiently. This manufacturing method also reduces the manufacturing cost.

To achieve the foregoing and other objects and in accordance with the purpose of the present invention, an improved stator is provided for use in an ultrasonic motor. The ultrasonic motor includes a rotor which cooperates with the stator, and a piezoelectric element for causing the stator to vibrate and for causing the rotor to rotate.

The stator is made of sintered metal. The stator includes a circular land portion which is connected to the piezoelectric element, and a plurality of teeth formed at the land portion by a plurality of radial slits. Each tooth includes a top surface for contacting with the rotor, a front surface for forming a part of the peripheral surface of the stator, and a rear surface facing the axial center. The front and rear surfaces are formed parallel to the axial center. It is preferable that each tooth includes a highly dense portion having a density ratio (Dr) of at least 90%.

The method for manufacturing the stator comprises step of compressing fine metal particle to form a pre-compression body having a predetermined shape, wherein the compression force is applied to the pre-compression body in the direction of the axial center, whereby the pre-compression body is provided with a plurality of projections for forming a plurality of teeth of the stator. The manufacturing method further includes the steps of baking the pre-compression body, for forming a sintered body, applying a sizing process to the sintered body; and applying a densification process to the teeth of the sintered body, whereby each tooth is provided with a highly dense portion having a density ratio (Dr) of at least 90%.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiment, together with the accompanying drawings in which:

FIGS. 17 and 18 are cross-sectional views illustrating the compression process applied on the stator after the sizing process has been applied;

FIGS. 19 and 20 are front views illustrating other modifications of the teeth;

FIG. 21 is a cross-sectional view illustrating yet another modification of the stator;

FIG. 22 is a cross-sectional view illustrating the reclaiming process applied to the top surface of the teeth;

FIG. 23 is a cross-sectional view of the tooth following the reclaiming process;

FIG. 24 shows the process for pounding the teeth;

DETAILED DESCRIPTION OF THE PREFERRED EMBODIMENT

A preferred embodiment of an ultrasonic motor according to the present invention will now be described referring to FIGS. 1 to 16.

Figure 1:
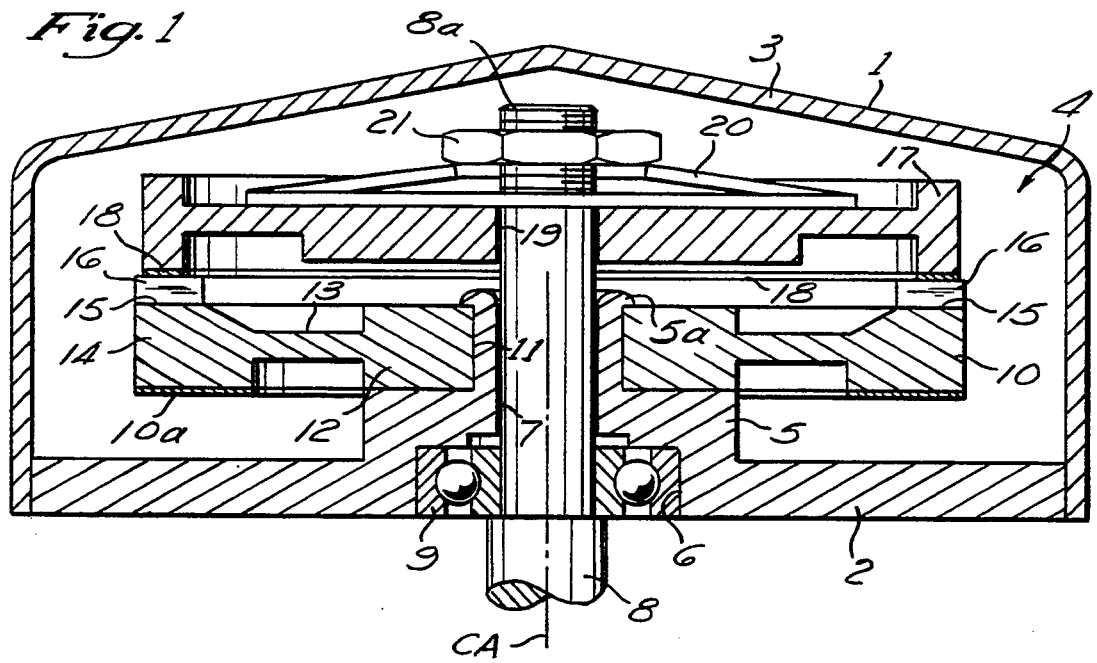
FIG. 1 is a cross-sectional view illustrating an ultrasonic motor according to the present invention.

As shown in FIG. 1, an ultrasonic motor includes a casing 1. The casing 1 includes a base 2 and a cover 3. A mounting space 4 is defined between the base 2 and the cover 3. The base 2 has a bed 5 which is disposed on the upper surface of the base 2 and projects upwardly. A mounting recess 6 is formed at the middle of the bottom surface of the base 2. A shaft hole 7 is formed in the central section of the base 2. A drive shaft 8 is inserted through the shaft hole 7. The drive shaft 8 is rotatably supported by a bearing 9 which is accommodated within the mounting recess 6. The distal end of the drive shaft 8 penetrates into the mounting space 4, through the shaft hole 7.

The bed 5 includes at least two engaging pieces 5a which are integrally formed with the bed 5 at the circumjacent edge of the shaft hole 7. A ring-shaped stator 10, which is made of sintered metal, is placed on the bed 5. The stator 10 has a central bore 11 in the central section thereof. After the engaging pieces 5a is passed through the central bore 11, an upper distal section of each engaging piece 5a engages the upper surface of the central bore 11. Thus, the stator 10 is secured to the bed 5. The central axis of the shaft hall 7 coincides with the central axis (CA) of the central bore 11 (or the stator 10). Consequently, the drive shaft 8 is located at the center of the stator 10.

The stator 10 includes an inner land portion 12 mounted on the bed 5, and an outer land portion 14 formed around the outer periphery of the stator 10. The stator 10 further includes a thin middle basin 13, which connects the inner land portion 12 and the outer land portion 14.

Figure 3A:
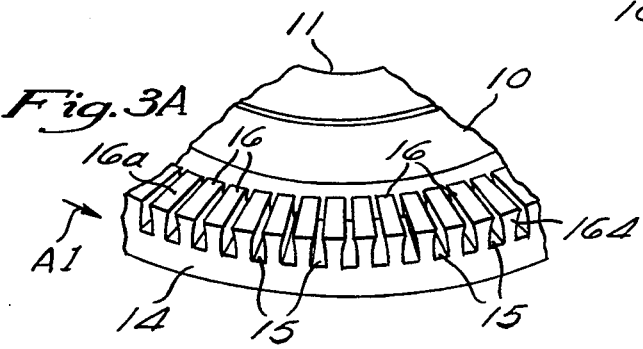
FIG. 3A is an enlarged partial perspective view of the stator.
Figure 4:
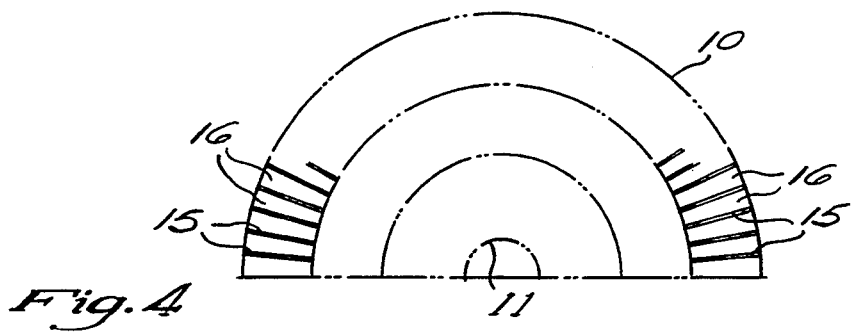
FIG. 4 is a partial plan view of the stator.

As shown in FIGS. 1, 3A and 4, the outer land portion 14 includes a plurality of slits 15 which are equidistally separated along the upper surface of the outer land portion 14, and which are radially engraved around the central bore 11. The slits 15 of the outer land portion 14 form a group of vibration teeth 16 on the stator 10, having a comb-like design. Each vibration tooth 16 has radially extending side surfaces, which have a generally rectangular shape with respect to the direction perpendicular to the radial direction of the stator 10 (for example, the direction shown by the arrow marked A1 with respect to the tooth 16A of FIG. 3A).

Figure 3B:
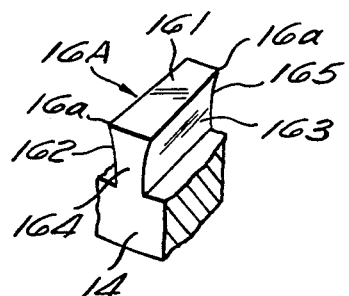
FIG. 3B is a greatly enlarged partial perspective view of one vibration tooth.

A detailed description of each tooth will now be described referring the tooth 16A of FIG. 3B. The tooth 16A includes a top surface 161, side surfaces 162 and 163 which extend along the radial direction of the stator, a front surface 164 which is a part of the outer periphery of the stator, and a rear surface 165 which faces toward the center of the stator 10. The front and rear surfaces 164 and 165 are formed in parallel with respect to the axial center (CA) of the stator 10. The top surface is horizontally extended, and perpendicular to the axial center of the stator 10. Therefore, the top surface 161 is perpendicular to the front and rear surfaces 164 and 165.

Figure 2:
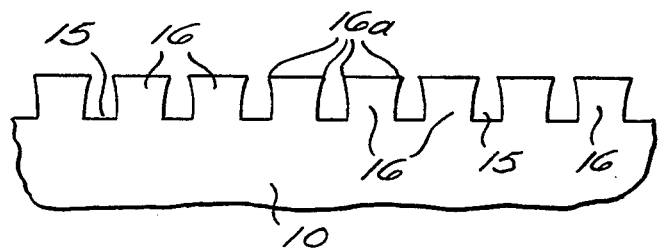
FIG. 2 is an enlarged partial front view illustrating vibration teeth used in a stator which constitutes part of the motor of FIG. 1.

As shown in FIGS. 2 and 3A, the width of the bottom side of each slit 15 is approximately 1 mm. Each tooth 16 has an enlarged portion 16a which has a gradually increasing cross-sectional width, from the base to the top. The gap between the top ends of the adjacent teeth 16 (the top width of the slit 15) is narrower than the bottom width of the slit 15. According to the present embodiment, the top width of the slit 15 is approximately 0.5 mm.

As shown in FIG. 1, a ring-shaped piezoelectric element 10a is attached to the bottom surface of the outer land portion 14. A rotor 17 is mounted on the stator 10. The rotor 17 is made of metal such as aluminum alloy. An inserting bore 19 is formed at the central portion of the rotor 17. The drive shaft 8 is introduced through the bore 19. The distal end of the drive shaft 8 protrudes upwardly, beyond the upper surface of the rotor 17. The rotor 17 is grounded electrically, via the rotor 17.

A lining 18 is bonded along the peripheral surface of the rotor 17, at the bottom of the rotor 17. The lining 18 is made of Teflon resin which has a superior deterioration resistance. A pressing member 20 is mounted on the upper surface of the rotor 17. The pressing member 20 urges the rotor 17 downwardly by engaging a threaded portion 8a formed at the distal end of the drive shaft 8, by means of a nut 21. Therefore, the rotor 17 is pressed against the upper surface of the stator 10, via the lining 18. A two-phase alternate voltage has its two phases 90 degrees out of phased with respect to each other, and is applied to the piezoelectric element 10a. Application of the voltage causes the piezoelectric element 10a to vibrate. The period vibration caused by the piezoelectric element 10a generates vibration with respect to each one of the teeth 16. As a result, progressive wave which has a one directional progression is generated within the teeth group of the stator 10. The rotor 17 and the drive shaft 8 are caused to rotate in the direction opposite to the direction of the progressive wave.

In this embodiment, the upper portion of the slit 15 is narrower than its bottom portion, due to the enlarged portion 16a formed in the tooth 16. Accordingly, the contacting area between the teeth 16 and the rotor 17 can be sufficiently large.

The method for manufacturing the stator 10 will now be described in detail.

Figure 5:
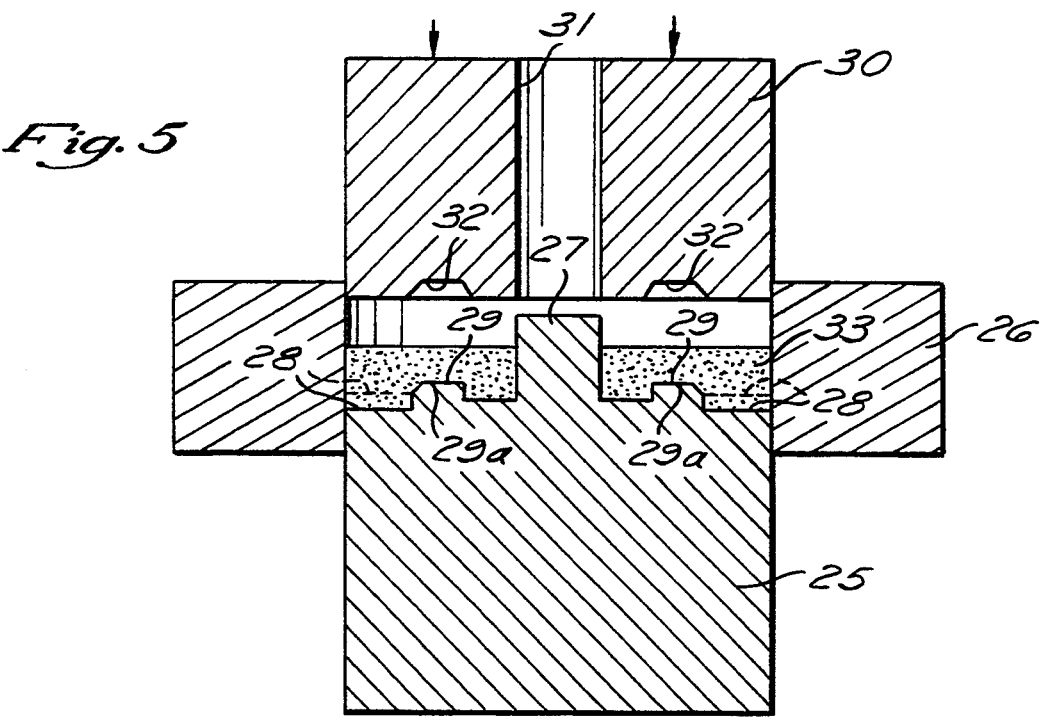
FIG. 5 is a cross-sectioned view illustrating the process for compressing fine particle in order to form a pre-compressed body of the stator.

The manufacturing process step for forming a pre-compressed body into a stator, will now be described. FIG. 5 shows a cross-sectional view of a pressing device for forming the pre-compressed body. The pressing device includes a first molding die 25 having a generally cylindrical shape, a molding guide 26 having a ring shape, and a second molding die 30 having a generally cylindrical shape. The second molding die 30 is disposed above the first molding die 25 and is oppositely disposed relative to the first molding die 25. The molding guide 26 is fitted in the upper portion of the first molding die 25.

The first molding die 25 includes a central projection 27 which is formed at the upper central portion and which has a hollow cylindrical shape. The first molding die 25 further includes a plurality of teeth forming recesses 28, which are formed on the upper surface of the first molding die 25, and which extend radially around the central projection 27. When viewed from the direction perpendicular to the radial direction of the die 25, each recess 28 has a substantially rectangular shape. The central projection 27 forms the central bore 11 within the stator 10 being produced. The recesses 28 produce the teeth 16 and the slits 15.

The first molding die 25 includes a ring-shaped projection 29 disposed inside the recesses 28. The projection 29 a circular recess 29a within the stator 10. As a result, the projection 29 forms the upper surface of the thin middle basin 13 of the stator 10.

The second molding die 30 is fitted to the molding guide 26, and is vertically slidable with respect thereto. The second die 30 includes a bore 31 formed at the center portion thereof, and a circular release recess 32 against the projection 29 of the first molding die 25. The central projection 27 of the first die 25 could be inserted through the bore 31. The release recess 32 is formed in the second molding die 30. This allows the compressed body (hereinafter called "primary processed stator"), to have generally uniform thickness at every portion, including the inner land portion 12, the outer land portion 14 and the middle section, where the thin middle basin 13 will be formed.

The first molding die 25 is filled with a predetermined mass of fine particle 33 used as raw alloy material (in this embodiment, phosphor bronze is used). Each recess 28 is filled precisely with a predefined amount of fine particle 33. Therefore, entire slits 15 and teeth 16 will be securely formed.

Compared to the process described in FIG. 5, the second molding die 30 can be filled with a predefined amount of fine particle 33, by placing the first and second dies 25 and 30 in the upside-down position. In this case, the stator 10, including the slits 15 and the teeth 16 is formed, as the first molding die 25 is caused to slide. However, the recesses 28 can not be precisely filled with the fine particle 33. Accordingly, an inferior stator could be, often, manufactured. Using the manufacturing process according to this embodiment as illustrated in FIG. 5, producing the inferior stator can be eliminated.

After filling the fine particle 33, the second molding die 30 compresses the fine particle 33 by a predetermined force, so as to produce the primary processed stator. Since the primary processed stator has a uniform thickness, the second molding die 30 can apply a uniform compression force to the entire section of the primary processed stator.

Therefore, the density of each portion of the primary processed stator can be uniform. As the cross-section of each recess 28 is substantially rectangular in shape, the fine particle filled in the recess 28 is compressed vertically. As a result, the entire section of each tooth 16 of the primary processed stator has a uniform density.

The sintering process of the primary processed stator which is formed as described above, will now be described in greater details.

The primary processed stator will be sintered by applying well-known sintered steps at high temperatures, within the well-known heating system (not shown). When the phosphor bronze is used as the raw material, the primary processed stator will contract by sintering. The dimensions of the secondary processed stator after sintering is generally 2% smaller with respect to the primary processed stator. Therefore, the sizing process is applied on the secondary processed stator, in order to gain the designed inner dimension of the central bore 11 formed in the stator 10.

Figure 6:
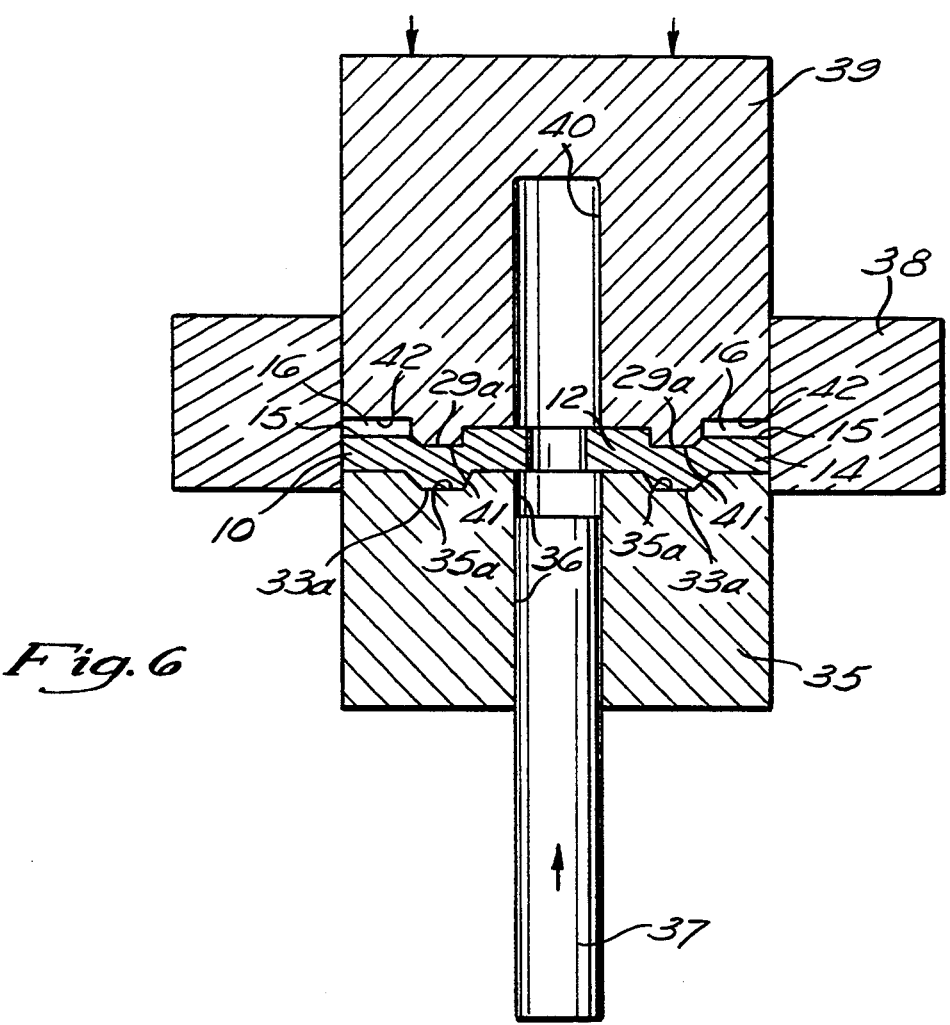
FIGS. 6 and 7 are cross-sectional views illustrating the sizing process for the sintered body.

The sizing process will now be described in greater details. FIG. 6 illustrates the apparatus for the sizing process. The apparatus includes a lower die casting 35 which has a generally cylindrical shape, a process guide 38 which has a ring shape, and an upper die casting 39 which has a cylindrical shape. The upper die casting 39 is disposed over the lower die casting 35 in an opposite relationship thereto. The process guide 38 is fitted into the upper portion of the lower die casting 35. The upper die casting 39 is slidably and vertically fitted with respect to the process guide 38.

The lower die casting 35 includes a bore 36 which is formed at the central portion thereof. A rod 37 is slidably disposed within the bore 36. The diameter of the rod 37 is generally equal to the inner diameter of the central bore 11 of the stator 10. The secondary processed stator which was sintered, is placed on the lower die casting 35. The lower die casting 35 includes a receiving recess 35a which receives the secondary processed stator while its teeth 16 face in the upward direction. The receiving recess 35a is formed at the position which corresponds to a projection 33a of the secondary processed stator.

The upper die casting 39 includes a bore 40 which is formed at the central portion thereof, and a projection 41 which is generally ring-shaped and which is disposed at the bottom surface thereof. The rod 37 is inserted into the bore 40. The projection 41 is formed in accordance with the circular recess 29a of the secondary processed stator, and can be inserted into the recess 29a. Furthermore, the upper die casting 39 includes a press portion 42 disposed at the outer side of the projection 41, for pressing against the corresponding top surface of the teeth 16.

Figure 7:
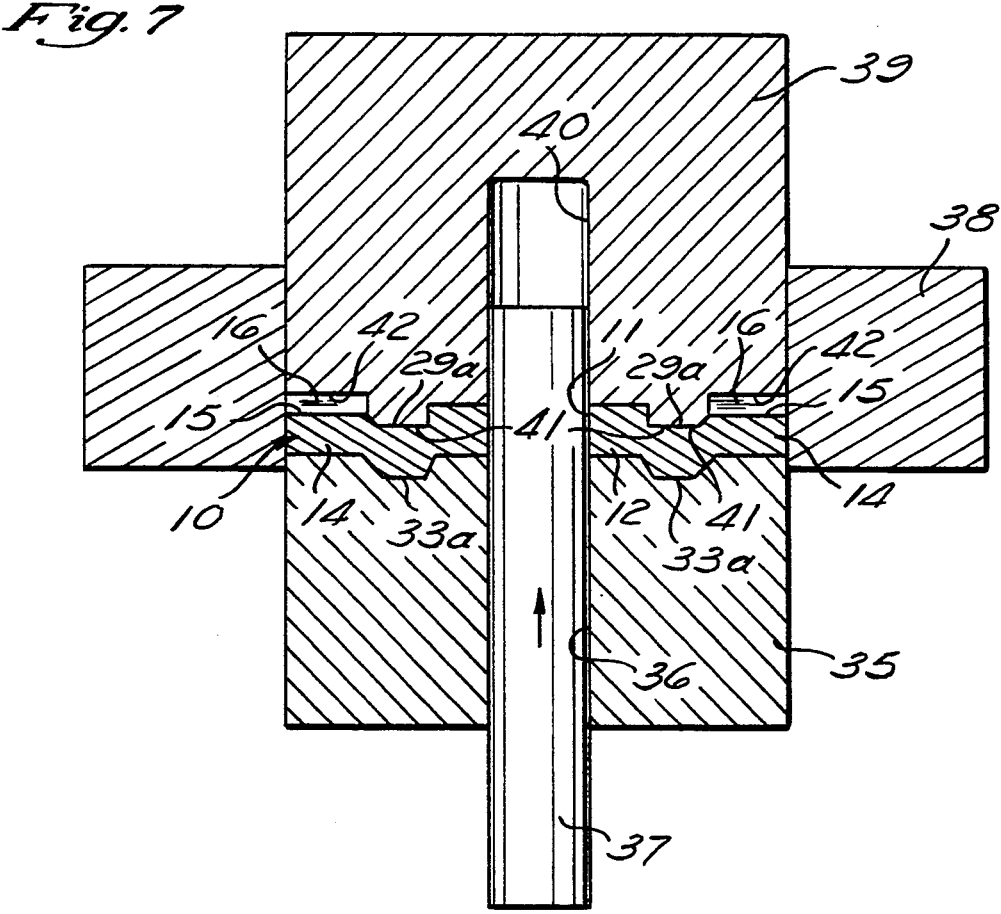

As shown in FIG. 6, the upper die casting 39 is caused to slide downwardly, where the secondary processed stator is placed on the lower die casting 35. Thereafter, the stator 10 is clamped by the upper die casting 39, lower die casting 35 and the process guide 38. After clamping the stator 10, as shown in FIG. 7, the rod 37 is caused to slide upwardly, for applying the shearing to the secondary processed stator. The central bore 11, which has the inner diameter corresponding to the diameter of the rod 37, is sheared in the secondary processed stator. The bore 11 is sheared according to the designed inner dimension.

Figure 8:
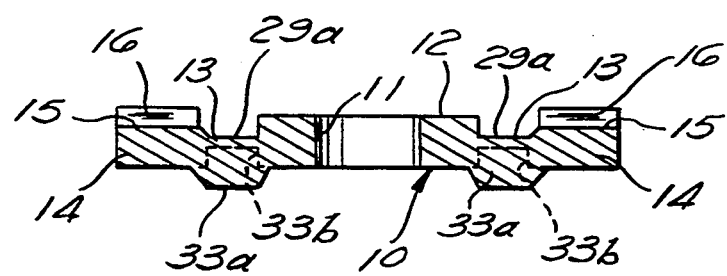
FIG. 8 is a cross-sectional view illustrating the stator following the sizing process.
Figure 9:
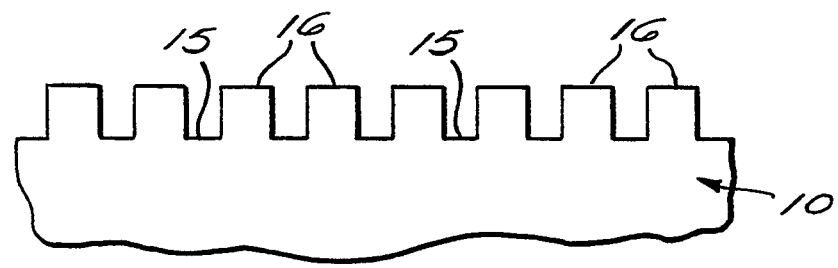
FIG. 9 is an enlarged partial front view illustrating the teeth prior to the sizing process.

FIG. 8 illustrates the tertiary processed stator treated by the sizing process. The tertiary processed stator still has a projection 33a corresponding to the release recess 32 of the second molding die 30. The cutting process is applied on the tertiary processed stator, in order to cut away the portion indicated by the dotted line. A cut recess 33b is formed in the tertiary processed stator by applying the cutting process thereon. As a result, the fourth processed stator, including the thin middle basin 13, is formed. The density of the thin middle basin 13 is generally equal to that of the inner and outer land portions 12 and 14, because the fourth processed stator is produced by means of the foregoing processes. The outside shape of each tooth 16 of the fourth processed stator is substantially rectangular. As shown in FIG. 9, the width of each slit 15 is about 1 mm.

The densification process, for increasing the density of the fourth processed stator will now be described in greater details. According to the present embodiment, the density of the teeth 16 of the fourth processed stator is increased by applying the pressure process.

A device used for applying the densification process includes three members 35M, 38M and 39M which are very similar to the die castings 35 and 39, and the guide 38, which are included in the sizing processed device. Therefore, the description of the three members 35M, 38M and 39M will be limited to the difference with respect to the corresponding members 35, 38 and 39, respectively. The members that are used in the members 35M, 38M and 39M, and which have the same configuration as the members 35, 38 and 39, are similarly marked.

Figure 10:
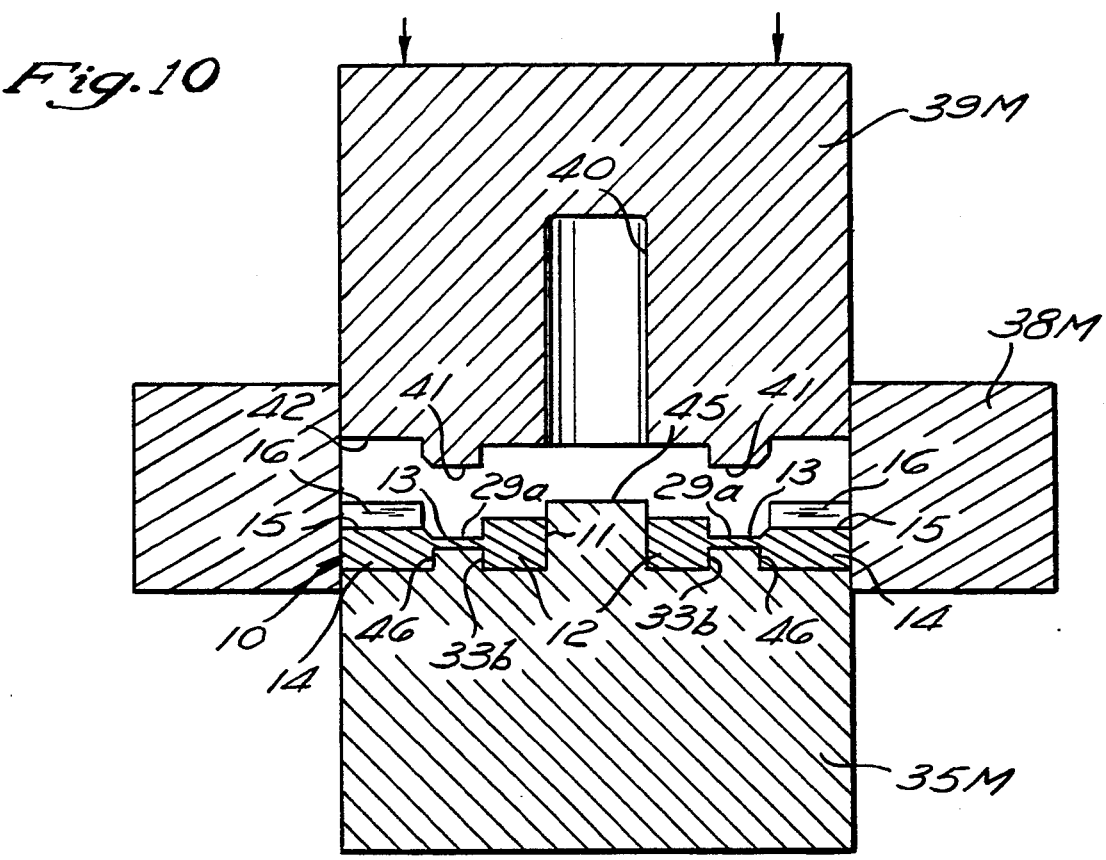
FIGS. 10 and 11 are cross-sectional views illustrating the compression process of the teeth.

As shown in FIG. 10, the lower pressing member 35M includes a projection 45, which has a cylindrical shape, which projects upwardly, and which is formed at the central portion thereof. The lower pressing member 35M further includes a supporting projection 46 which has a generally ring shape and which is formed in the upper surface thereof. The projection 45 is inserted into the bore of the fourth processed stator.

Figure 11:
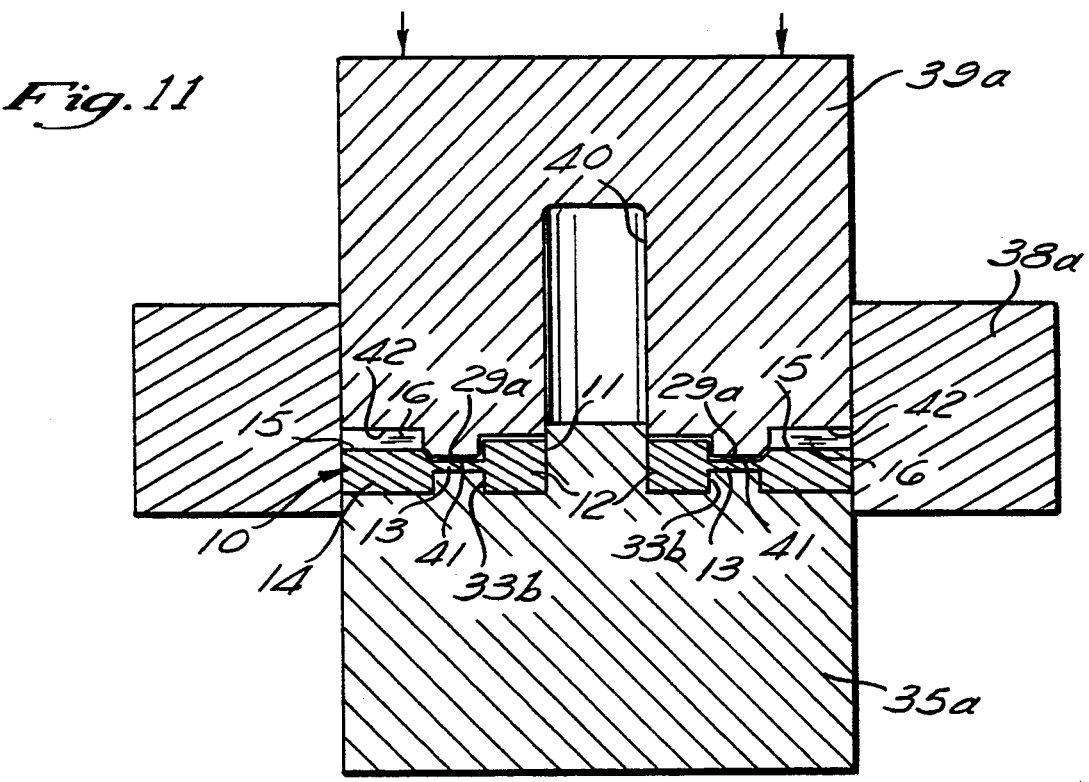

The ring-shaped supporting projection 46 is inserted into the corresponding recess 33b of the fourth processed stator. The press portion 42 of the upper pressing member 39M is formed in such a way that the press portion 42 abuts against the teeth 16, before the projection 41 of the upper pressing member 39M and the bottom surface of the pressing member 39M which is disposed inwardly abut the upper surface of the thin middle basin 12, and the bottom surface of the circular recess 29a. Therefore, as shown in FIG. 11, this densification device can apply an urging pressure on the selected portions, such as teeth 16 and the outer land portion 14, by the press portion 42.

During the densification process, as shown in FIG. 10, the fourth processed stator is placed on the lower pressing member 35M with the teeth 16 facing in the upward direction. When the upper pressing member 39M is caused to slide downwardly, the teeth 16 and the outer land portion 14 are pressed by the press portion 42. As a result, the top portion of each tooth 16 extends into an enlarged portion 16a, as shown in FIGS. 2 and 3B. The gap between the adjacent enlarged portions 16a is set to 0.5 mm.

Furthermore, the pressing decreases the vacancy within the sintered product, in the sections corresponding to the outer land portion 14 and the teeth 16, thereby causing the vacancy ratio in these sections to decrease. According to the present embodiment phosphor bronze is used, and the vacancy ratio is in the range between 5% to 15%. Decreasing the vacancy ratio means an increase in density.

It is preferable that the top surface 161 of the teeth 16 be aligned on an imaginary plane surface. In other words, the height of each top surfaces 161 should be coplanar. However, practically, it would be impossible to obtain such a result. In order to measure the alignment of the top surfaces 161, the measuring unit of "flatness" is employed in this specification. The flatness (FL) is defined as the maximum value of the height difference of the top surface of all the teeth 16. Therefore, the smaller the flatness (FL) is, the better the alignment of the top surfaces is. The flatness (FL) is greatly improved by applying the compression process.

The stator 10 as shown in FIGS. 1 to 4 can be manufactured using the steps described above. The operation of the ultrasonic motor employing the stator 10 is also described above.

As described above, each tooth 16 is caused to vibrate by the action of the piezoelectric element 10a. It is known that those vibrations cause the rotor 17 to efficiently rotate, and to increase its rotational torque and output power. Forming the enlarged portion 16a by the pressing process causes the tooth top surface 161 to increase its area. As a result, the contact area between the rotor 17 and the teeth 16 is increased. Therefore, the vibration of the tooth is efficiently transmitted to the rotor 17.

Furthermore, as the flatness of the teeth 16 is significantly improved, the contact ability between the tooth top surfaces 161 and the rotor 17 is caused to increased. With this increment, the vibration of the tooth 16 is efficiently transmitted to the rotor 17. The stator 10 according to the present embodiment presents a significant improvement to the rotational torque and output power of the rotor 17.

The characteristics of the foregoing stator will now be described in greater details.

Figure 12:
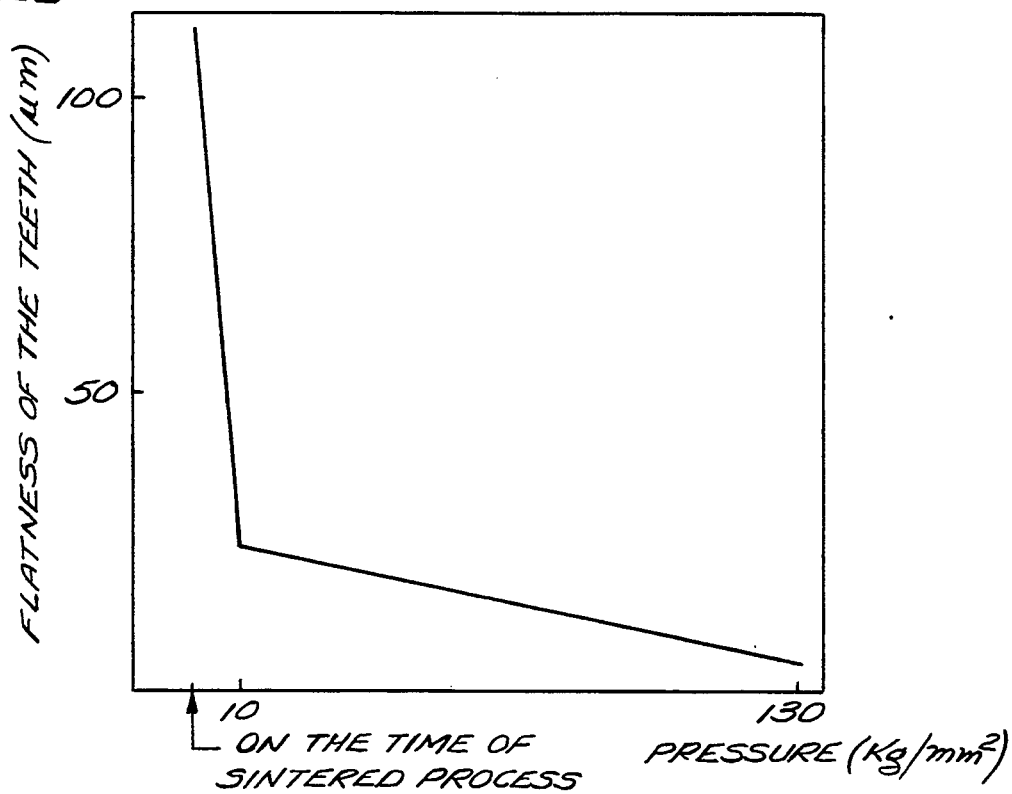
FIG. 12 is a graph showing the relationship between pressure and the flatness of the teeth in the stator.

FIG. 12 illustrates the relationship between the pressure, which is applied against the tooth 16 of the fourth processed stator 10 under the densification process (referring to "surface pressure" hereinafter), and the flatness of the top surfaces of the teeth 16. The flatness of the secondary processed stator after the sintering process is approximately 120 $\mu$m. According to FIG. 12, when the surface pressure is 10 kg/mm$^2$, its flatness will be approximately 25 $\mu$m. When the surface pressure is 130 kg/mm$_2$, its flatness will be approximately 5 $\mu$m. As the surface pressure increases, the flatness is significantly improved. However, if the surface pressure exceeds 10 kg/mm$^2$, the improvement ratio of the flatness will be significantly decreased.

Figure 13:
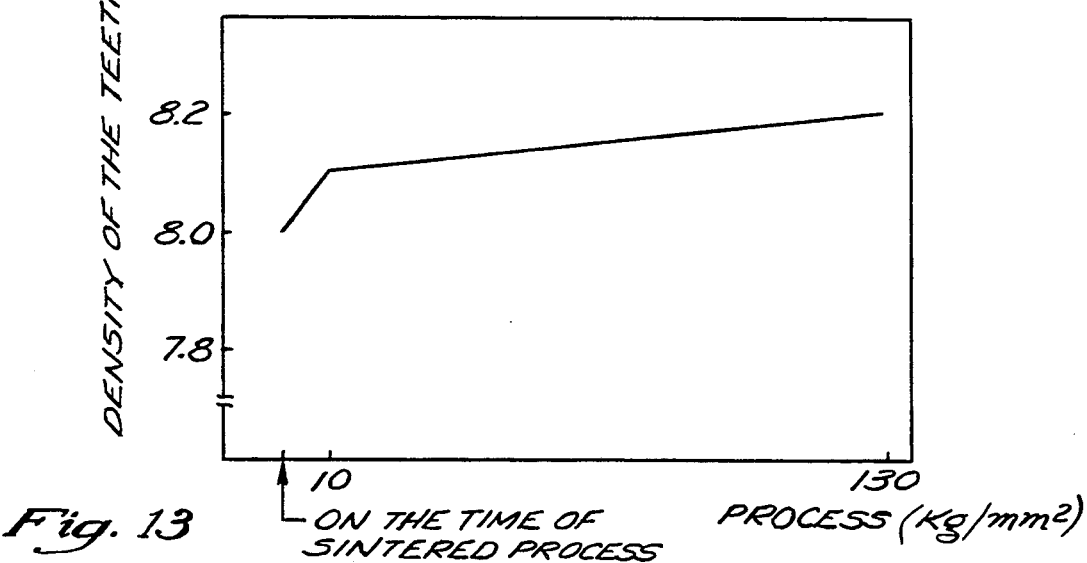
FIG. 13 is a graph showing the relationship between the pressure and the density of the tooth.

FIG. 13 illustrates the relationship between the pressure, which is applied against the teeth 16 of the fourth processed stator under the densification process, and the density of the teeth 16. The density of the teeth 16 of the secondary processed stator after the sintering process is approximately 8.0 g/cm$^3$. When the surface pressure is 10 kg/mm$^2$, the density will be 8.1 g/cm$^3$. When the surface pressure is 130 kg/mm$^2$, the density will be approximately 8.2 g/cm$^3$. As indicated in FIG. 13, as the surface pressure increases, the density of the teeth 16 is caused to increase. However, when the surface pressure exceeds 10 kg/mm$^2$, the increasing rate for the density decreases, and the graph becomes flat. As shown in FIGS. 12 and 13, the surface pressure is preferably set at 10 kg/mm$^2$.

The parameter referred to as "density ratio" will now be defined. The density ratio is defined by dividing the density of the teeth of the processed stator 10 by the density of the raw metal material.

The density of the phosphor bronze, which is used as raw material, is 8.93 g/cm$^3$. As the density of the tooth 16 according to the present embodiment is defined as "D", the density ratio (Dr) of the tooth is defined by the following equation: Dr (%)=(D/8.93)×100. And, the vacancy ratio (Pr) is defined by the following equation: Pr (%)=100−Dr. If the density of the tooth of the secondary processed stator after the sintering process is 8.0 g/cm$^3$, the density ratio (Dr) is 89.6%, and the vacancy ratio (Pr) is 10.4%.

When the surface pressure is 10 kg/mm$^2$, the density of the tooth 16 is 8.1 g/cm$^3$. The density ratio of that tooth, therefore, is 90.7%, and the vacancy ratio is 9.3%. Furthermore, when the surface pressure is 130 kg/mm$^2$, the density of the tooth is 8.2 g/cm$^3$. At this time, the density ratio of the tooth is 91.8%, and the vacancy ratio is 8.2%. As the pressure of more than 10 kg/mm$^2$ is applied on the secondary processed stator, the density ratio (Dr) of the tooth exceeds 90%, so that the high densification of the teeth can be achieved.

The following description teaches how the physical characteristic of the stator influences the performance of the ultrasonic motor.

Figure 14:
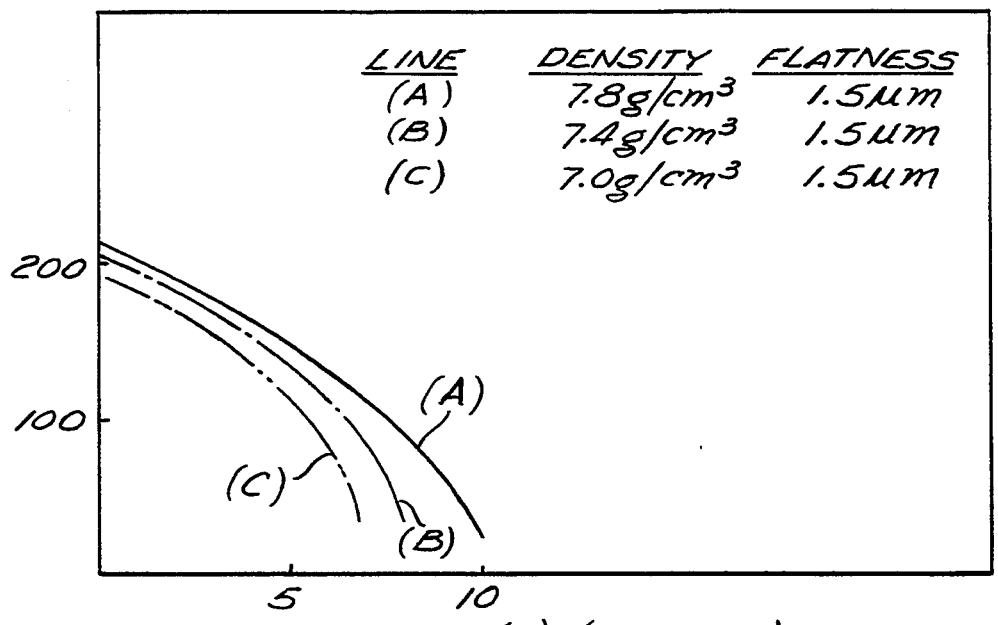
FIGS. 14, 15 and 16 are graphs showing the relationship between the torque and the number of revolution of the ultrasonic motor.

FIG. 14 shows the relationship between the motor torque (T) and the number of revolution (N), in three different motors, each of which has a tooth density different from the other. A solid line (A) shows the characteristic of the ultrasonic motor with the stator 10 having the tooth 16 with a density of 7.8 g/cm$^3$. A dotted line (B) shows the characteristic of the ultrasonic motor with the stator 10 having the tooth 16 with a density of 7.4 g/cm$^3$. A double-dotted line (C) shows the characteristic of the ultrasonic motor with the stator 10 having the tooth 16 with a density of 7.0 g/cm$^3$. The flatness of all these three motors is about 1.5 μm. FIG. 14 indicates that as the density of the tooth 16 increases the torque generatable by the motor increases.

Figure 15:
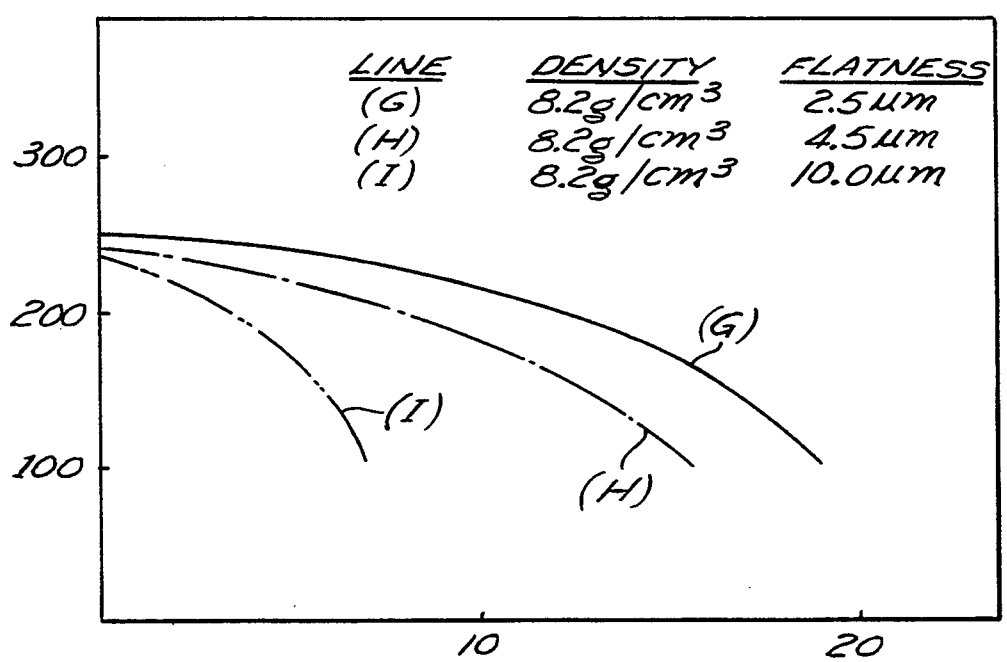

FIG. 15 shows the relationship between the motor torque (T) and the number of revolution (N), in three different motors, each of which has a different flatness. A solid line (G) shows the characteristic of the ultrasonic motor with the stator 10 having a surface flatness of 2.5 μm. A dotted line (H) shows the characteristic of the ultrasonic motor with the stator 10 having a surface flatness of 4.5 μm. A double-dotted line (I) shows the characteristic of the ultrasonic motor with the stator 10 having a surface flatness of 10.0 μm. The teeth 16 of all the stators of these three motors have a density of 8.2 g/cm$^3$. As indicated in FIG. 15, the better the flatness, the larger the torque generatable by the motor.

Figure 16:
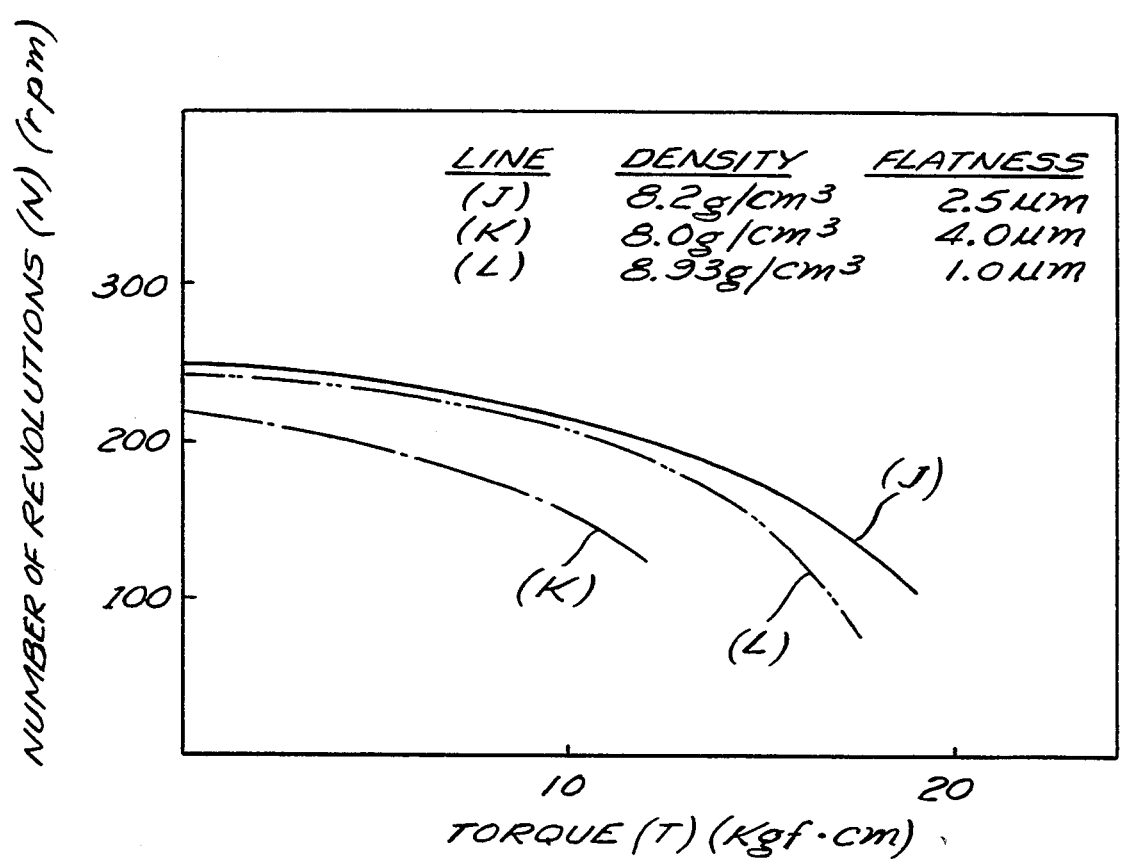

FIG. 16 shows the relationship between the motor torque (T) and the number of revolutions (N), in three different motors, each of which is manufactured by a manner different. A solid line (J) shows the characteristic of the ultrasonic motor with the stator 10 (tooth density: 8.2 g/cm$^3$, flatness: 2.5 μm) according to the present embodiment. The compression process was applied to the stator of the motor corresponding to the solid line (J). A dotted line (K) shows the characteristic of the ultrasonic motor with the stator (tooth density: 8.0 g/cm$^3$, flatness: 4.0 μm), whereby the sintering process was applied to the stator, but not the compression process. A double-dotted line shows the characteristic of the ultrasonic motor with the conventional stator 50 (tooth density: 8.93 g/cm$^3$, flatness: 1.0 μm), which is manufactured by directly cutting a single metal block (phosphor bronze).

As is clearly apparent from FIG. 16, the motor (J) having the stator 10 to which the compression process is applied, can generate a larger torque than the motor (K) whose stator was not treated by the compression process. Furthermore, the motor (J) has a slight advantage in its torque generation feature than the motor (L) having the conventional stator 50, which is manufactured by the cutting process. If the flatness of the stator 10 which is treated by the compression process has a similar value to that of the conventional stator 50, the motor having the stator 10 described in this embodiment can generate a larger torque than that of the motor having the conventional stator 50.

According to the present embodiment, the top surface 161 of each tooth 16 is horizontally formed, and the front and rear surfaces 164 and 165 are vertically formed. Accordingly, when the primary processed stator 10 is manufactured by compressing the fine particle 33, the entire parts of each tooth are compressed by the uniform compression force. As a result, the density of each part forming the tooth 16 becomes uniform, and the resulting stator has teeth 16 with consistent density. The stator 10 according to the present embodiment does not include the conventional shortcoming that vibration of the piezoelectric element 10a is transmitted to the tooth with some vibration being partially dampened, due to non-uniformity of the tooth density. The stator 10 according to this embodiment can transmit stable vibration of the piezoelectric element 10a to the rotor 17.

According to this embodiment, the compression process causes the density of the teeth 16 and the outer land portion 14 to increase (vacancy ratio is decreased). Therefore, the vibration generated by the piezoelectric element 10a is transmitted to the rotor 17 without any reduction, in order for the rotor 17 to rotate efficiently.

Furthermore, the compression process allows the stator 10 to have a significantly improved flatness. The improved flatness causes the contact ratio between the top surface 161 of the tooth 16 and the bottom surface of the rotor 17 to increase. As a result, the vibration originating from the piezoelectric element 10a is efficiently transmitted to the rotor 17, so that the torque and revolution efficiency of the motor can be improved. In addition, the excellent flatness results in shortening the polishing time for further improvement of its flatness.

In this embodiment, the secondary processed stator includes the projection 33a for keeping the thickness at every part of the secondary stator uniform. A part of the tertiary processed stator, which is obtained after the sizing process, is cut away to form the cut recess 33b, so that the thin middle basin 13 is formed in the stator 10. Processing the stator by the above-described steps permits the density of the thin middle basin 13 to be equal to that of the outer land portion 14 and the teeth 16. If the primary processed stator, which includes the thin middle portion having a thickness different from that of the outer land portion, were formed during the particle compression process, the density of the thin middle portion would be larger than that of the outer land portion, and the stator 10 could not be manufactured with the desired density distribution.

The thin middle basin 13, which is formed in the stator 10, decreases the transmission of vibration generated by the piezoelectric element 10a to the inner land portion 12. Therefore, the thin middle basin 13 prevents the motor casing 1 from generating noise, based on the vibration of the piezoelectric element 10a.

Although only one embodiment of the present invention has been described herein, it should be apparent to those skilled in the art that the present invention may be embodied in many other specific forms without departing from the spirit or scope of the invention. Particularly, it should be understood that following modifications could be embodied:

In the device shown in FIG. 11, the entire bottom surface of the upper die casting 39 may come into close contact with the entire top surface of the stator 10, by means adjusting the height of the press portion 42. In this case, the density of the stator 10 is entirely increased by the compression process.

In the embodiment described above, after the compressing process is applied on the teeth 16, the lapping treatment can be applied on the top surfaces 161 of the teeth 16, if required.

Figure 17:
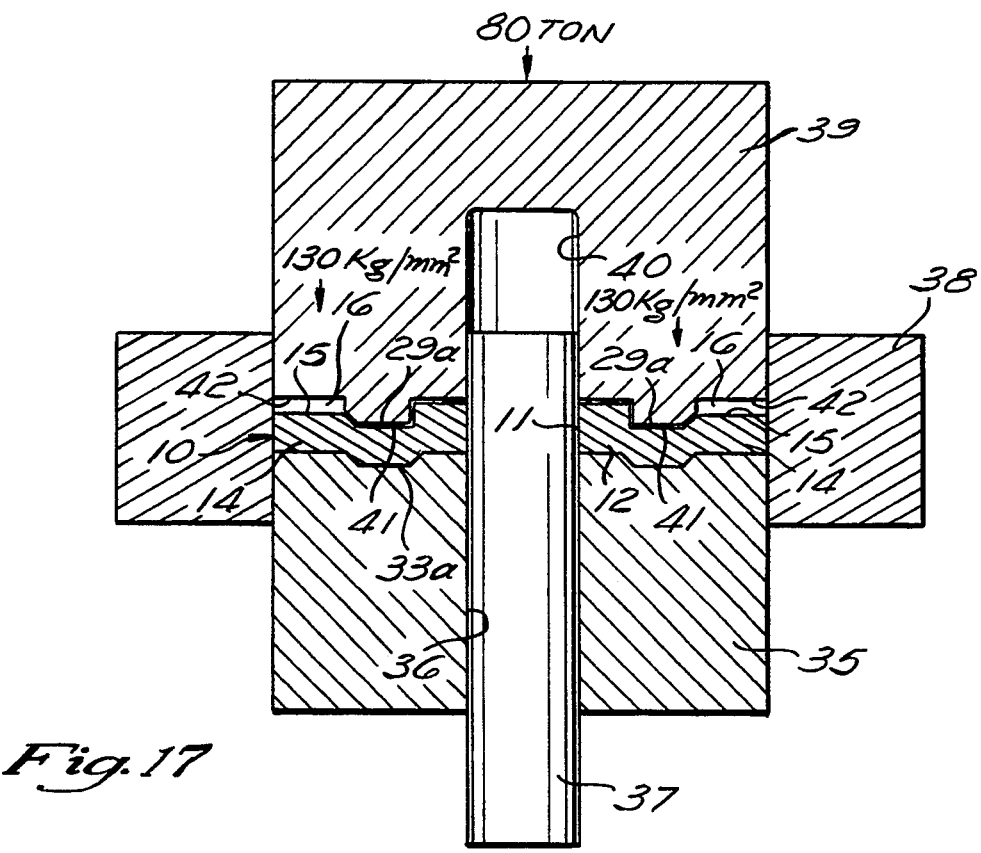
FIGS. 17 through 24 illustrate alternative embodiments according to the present invention.

As shown in FIG. 17, at the same time when the sizing process is applied, the compression process can be applied on the stator. The upper die casting 39 used in the device shown in FIG. 17 is shaped to contact the teeth 16 only, but not the other portions of the stator 10. Therefore, the upper die casting 39 can press the teeth 16 with a significant force (130 kg/mm$^2$). At this time, the load applied on the upper die casting 39 should be 80 tons.

Figure 18:
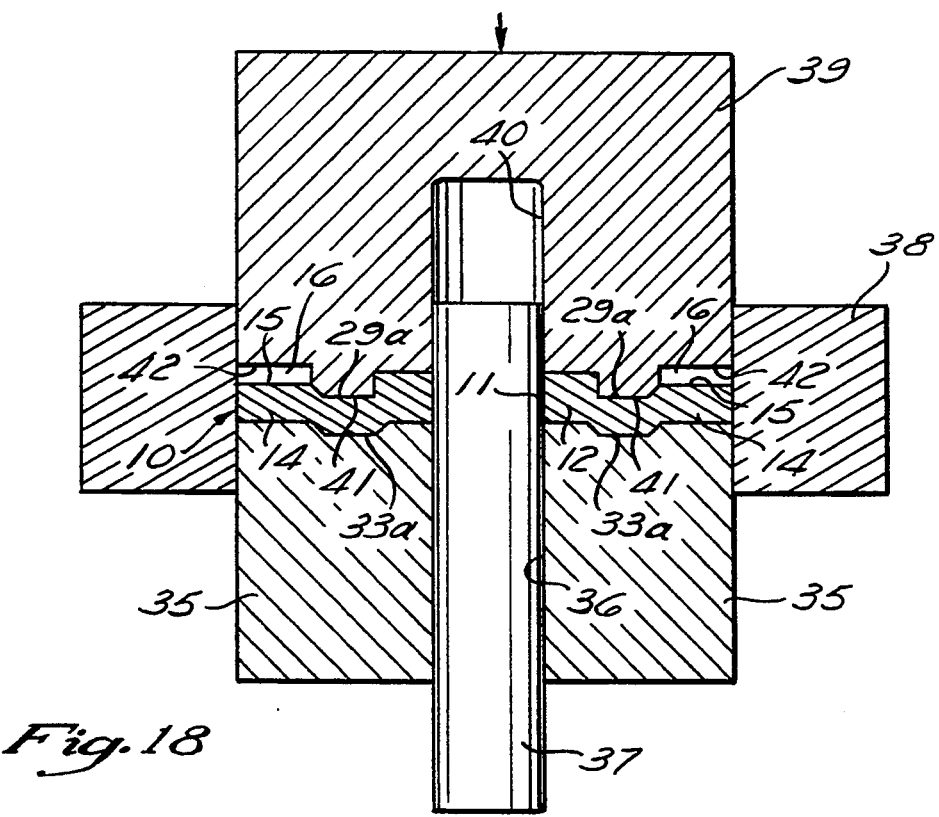

After the upper portions of the teeth 16 are compressed by the compression with the upper die casting 39, the other portions of the stator 10 except the teeth, would be compressed by the upper die casting 39, as shown in FIG. 18. Each portion of the stator 10, before the projection 33a is removed, has a generally uniform thickness. Therefore, the density of the inner land portion 12 and the thin middle basin 13 could be made uniform by means of the compression process. In addition, when the entire stator is compressed, the rod 37 is inserted into the central bore 11 of the stator 10. Therefore, the rod 37 prevents the inner wall of the stator 10 forming the central bore 11 from expanding inwardly under the compression force. The processes shown in FIGS. 17 and 18, also enable the stator 10 to have a high density.

The gap between the upper portions of the adjacent teeth 16, as shown in FIGS. 2 and 3 is set at 5 mm, according to the above-mentioned embodiment. The upper gap is not limited to the previous value set above. The upper gap is preferably set as small as possible, provided the adjacent teeth 16 do not interfere with each other, when they vibrate. Since, by reducing the upper gap the area of the tooth top surface 161 increases, the contact area between the teeth 16 and the rotor 17 increases.

The gap between the base portions of the adjacent teeth 16 is preferably equal to or less than 1 mm, (FIGS. 2 and 3). If the gap becomes larger than 1 mm, the vibration of the teeth 16 is not properly transmitted to the rotor 17, and the rotor 17 does not rotate efficiently.

In the embodiment described in above, before the enlarged portion 16a is formed in each of the tooth 16 by the compression process, the plurality of slits 15 having a width of 1 mm are previously formed in the stator 10. If the width of the previously formed slit were less than 1 mm, it would be very difficult to produce the stator 10, using the sintering technique. Accordingly, the steps for manufacturing the vibration teeth 16 according to the present invention are the best steps for producing the stator 10 made of sintered metal.

Figure 19:
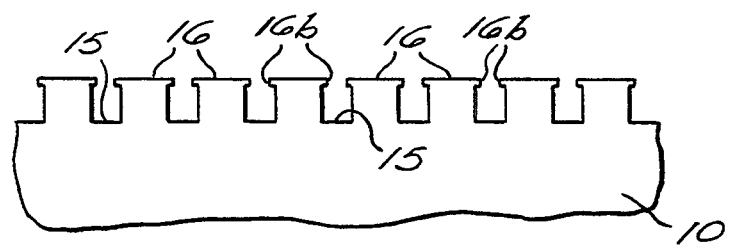
Figure 20:
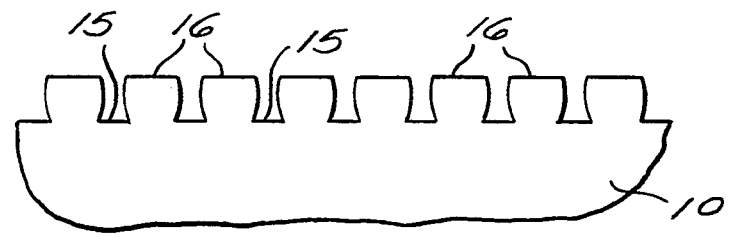

As shown in FIG. 19, each tooth 16 may have top projections 16b which are expanded horizontally, so that each tooth 16 is generally T-shaped. Furthermore, as shown in FIG. 20, each tooth 16 might have a beer barrel shape as a result of the compression process. In this case, the width of the top surface of each tooth 16 is wider than that of the base portion thereof. The widened top surface causes the contact area between the teeth 16 and the rotor 17 to increased.

Figure 21:
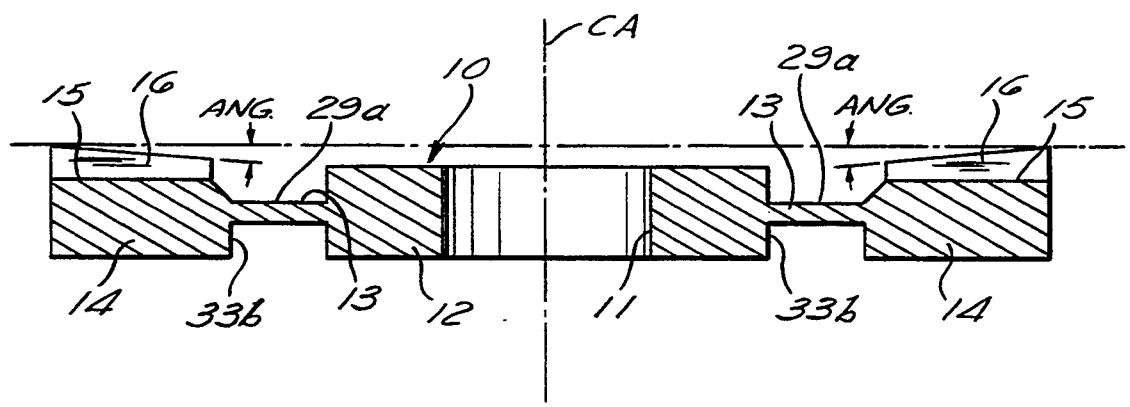

In the embodiment described above, the top surfaces 161 of the teeth 16 are horizontally formed. As shown in FIG. 21, the top surface 161 can be inclined toward the axial center (CA) by a predetermined angle (ANG). The inclined surfaces 161 can be formed at the time when the compression process is applied on the stator, or by the lapping process, after the compression process is applied on the stator. When the diameter of the stator is 60 mm, the inclination angle (ANG) is preferably in the range of 10 minutes to 100 minutes (1 minute=1/60 degree).

The rotor 17 is disposed on the top surfaces of the teeth 16. The pressing member 20 presses the rotor 17 against the teeth 16. Therefore, the outer land portion 14 of the stator 10 is caused to bend downwardly, by the urging force of the pressing member 20. However, in the stator 10 having the inclined tooth top surfaces as illustrated in FIG. 21, the bottom surface of the rotor 17 almost completely contacts the tooth top surfaces of the stator 10, even though the outer land portion 14 is bent. The inclination angle (ANG) can be varied in accordance with the urging force of the pressing member 20. When the tooth top surface 161 is inclined, there will no longer be a need to form the inclined surface at the bottom of the rotor 17.

Figure 22:
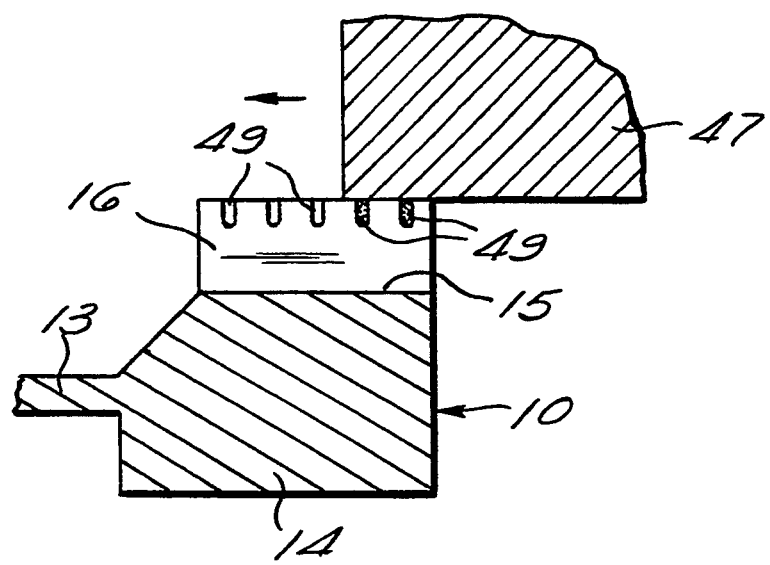

A plurality of cavities, at the top portion of each tooth 16, are shown in FIG. 22. As a matted material 47 is radially (or circumferencely) slidable on the top surface of the teeth 16, the cavities 49 may be filled by the matted material 47. After the filling process is completed, the polishing process (lapping) is applied on the tooth top surfaces. Thus, the smoothness of the tooth top surfaces is significantly improved. The foregoing filling process can be applied at any time after the sintering process. In addition, the stator 10 is essentially porous, since it is made of sintered metal. Therefore, the process for making the bottom surface of the outer land portion 14 rough is no longer needed, in order to securely attach the piezoelectric element 10a to the bottom surface of the outer land portion 14, using adhesive.

Figure 23:
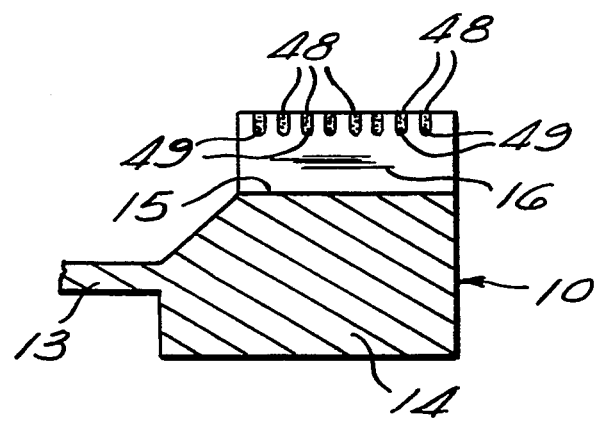

According to the embodiment described above, the density of the teeth 16 is increased by the compression process. As shown in FIG. 23, the density of the teeth 16 can be increased by casting the melted copper 48 into the cavities 49. The material to be casted into the cavities 49 should be able to transmit the vibration accurately. As such, the following exemplary material could be used: metals such as copper, zinc, aluminum and silver, and high molecular compounds.

Figure 24:
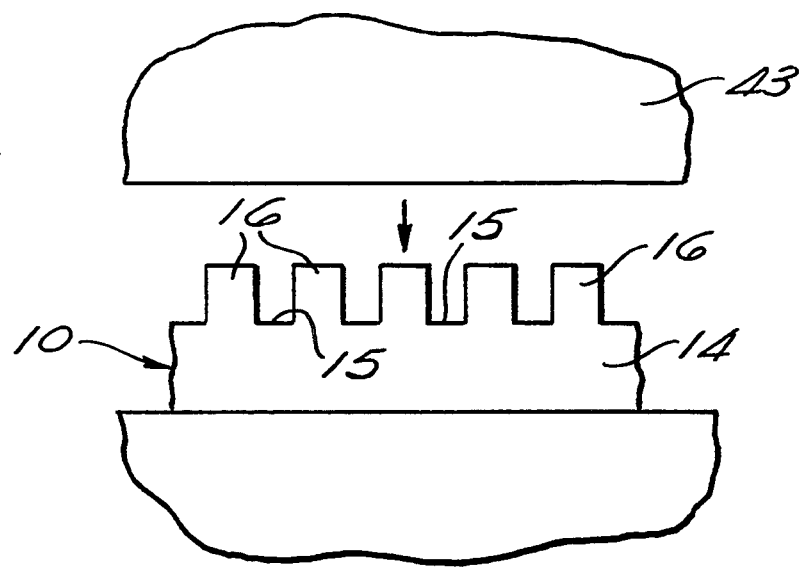
Figure 25:
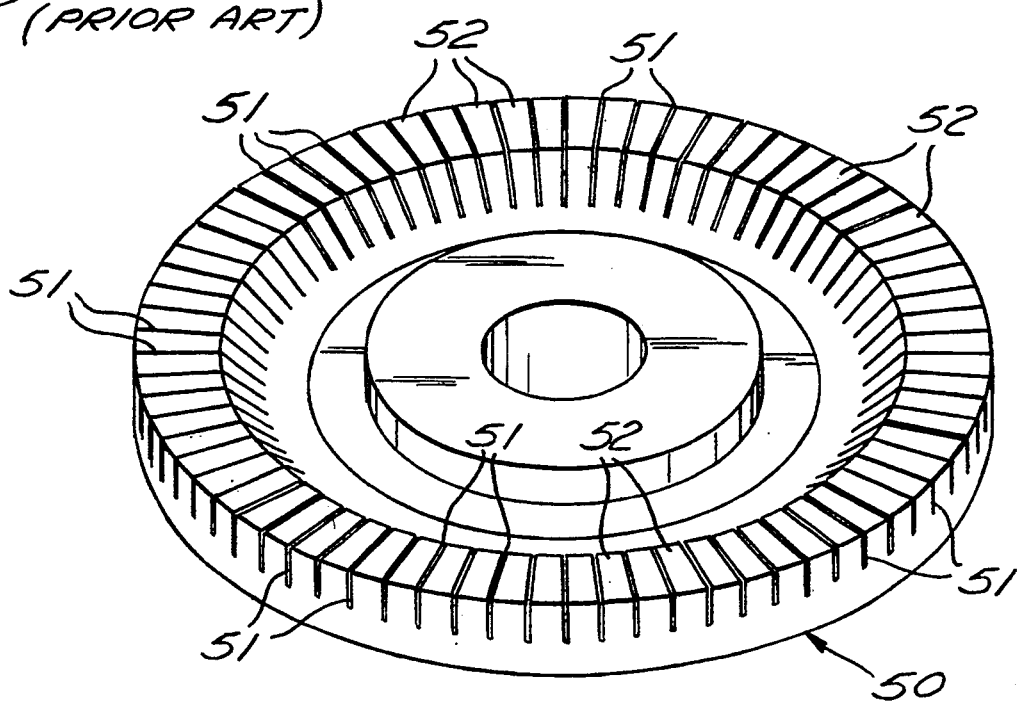
FIG. 25 is a perspective view of a conventional stator.
Figure 26:
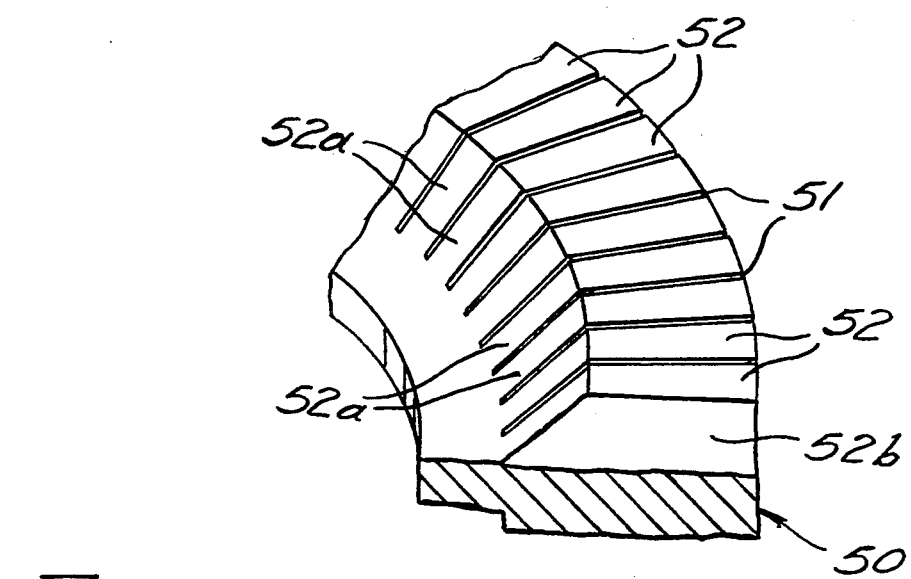
FIG. 26 is an enlarged partial perspective view of the conventional stator.

Furthermore, in the embodiment described above, after the thin middle basin 13 has been formed in the stator by cutting away the projection 33a, the teeth 16 can be directly stamped by a stamping die 43, as shown in FIG. 24. By this stamping process, the flatness at the tooth top surfaces can be set within the predetermined standard range. The teeth 16 and the bottom portion of the outer land portion 14 become dense, by the stamping process.

The embodiment described above is related to the two phase progress wave type ultrasonic motor which uses the two phase alternate voltage. The present invention can be applied to an ultrasonic motor which uses a single phase or a three phase alternate voltage.

Therefore, the present examples and embodiments are to be considered as illustrative and not restrictive and the invention is not to be limited to the details giving herein, but may be modified within the scope of the appended claims.

What is claimed is:

1. A stator for use in an ultrasonic motor including a rotor and a piezoelectric element for causing the stator to vibrate and the rotor to rotate, the stator being made of sintered metal, the stator comprising:

a generally circular inner land portion to be mounted on a casing of the ultrasonic motor;

an outer land portion integrally formed with said inner land portion, to be secured to the piezoelectric element;

a plurality of teeth formed at said outer land portion by a plurality of radial slits, each of said teeth including a highly dense portion having a density ratio (Dr) of at least 90 percent; and the density of said inner land portion being lower than that of said highly dense portion of said teeth.

2. The stator according to claim 1, wherein each tooth includes a base portion which is secured to said outer land portion, and an enlarged distal end portion larger than said base portion, and wherein said distal end portion corresponds to said highly dense portion.

3. The stator according to claim 1, wherein said sintered metal is phosphor bronze.

4. The stator according to claim 1, wherein each of said teeth includes a top surface for contacting the rotor, a front surface for forming a part of the peripheral surface of the stator, and a rear surface facing an axial center of the stator;

wherein said front and rear surfaces are generally parallel to said axial center; and wherein said top surface is generally perpendicular to said axial center, whereby side surfaces of each tooth formed with said front, rear and top surfaces are substantially rectangle.

5. The stator according to claim 1, wherein each of said teeth includes a top surface for contacting the rotor, a front surface for forming a part of the peripheral surface of the stator, and a rear surface facing an axial center of the stator;

wherein said front and rear surfaces are generally parallel to said axial center; and wherein said top surface is a tapered surface including an inner edge that is proximate to said axial center, and an outer edge connecting the peripheral surface of the stator, which is higher than said inner edge.

6. The stator according to claim 5, wherein the inclination angle of said tapered top surface is in the range of 10 minutes to 100 minutes.

7. The stator according to claim 1 further comprising a thin middle basin (13) integrally formed with said inner and outer land portions, for connecting their land portions with each other, the density of said middle basin being lower than that of said highly dense portion of said each tooth.

* * * * *